(12) United States Patent
Taguchi

(10) Patent No.: US 8,909,036 B2
(45) Date of Patent: Dec. 9, 2014

(54) OPTICAL DEVICE

(71) Applicant: Olympus Imaging Corp., Shibuya-ku, Tokyo (JP)

(72) Inventor: Yuzuru Taguchi, Tachikawa (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/025,297

(22) Filed: Sep. 12, 2013

(65) Prior Publication Data

US 2014/0079380 A1 Mar. 20, 2014

(30) Foreign Application Priority Data

Sep. 14, 2012 (JP) ................................. 2012-203605

(51) Int. Cl.
| | |
|---|---|
| G03B 7/00 | (2014.01) |
| G03B 13/34 | (2006.01) |
| G03B 7/20 | (2006.01) |
| G03B 9/02 | (2006.01) |
| G03B 7/04 | (2006.01) |
| H04N 5/235 | (2006.01) |
| H04N 5/232 | (2006.01) |
| G02B 7/08 | (2006.01) |

(52) U.S. Cl.
CPC *G03B 7/20* (2013.01); *G03B 13/34* (2013.01); *G03B 9/02* (2013.01); *G03B 7/04* (2013.01); *H04N 5/235* (2013.01); *H04N 5/232* (2013.01); *G02B 7/08* (2013.01)
USPC ................................................ 396/63; 396/65

(58) Field of Classification Search
USPC .............................. 396/63–70, 257, 259–262
See application file for complete search history.

(56) References Cited

U.S. PATENT DOCUMENTS

2013/0010137 A1* 1/2013 Kawai ........................ 348/208.1

FOREIGN PATENT DOCUMENTS

JP 11-231210 8/1999

* cited by examiner

*Primary Examiner* — W B Perkey
*Assistant Examiner* — Minh Phan
(74) *Attorney, Agent, or Firm* — John C. Pokotylo; Straub & Pokotylo

(57) ABSTRACT

An optical device includes an optical system, a diaphragm unit, a diaphragm unit, a focus-lens driving unit, a diaphragm driving unit, and a diaphragm control unit. The diaphragm control unit controls the diaphragm driving unit in accordance with the position to which the focus lens group has been moved by the focus-lens driving unit, thereby controlling the aperture opening of the diaphragm unit and ultimately limit a light beam passing through the camera system.

14 Claims, 12 Drawing Sheets

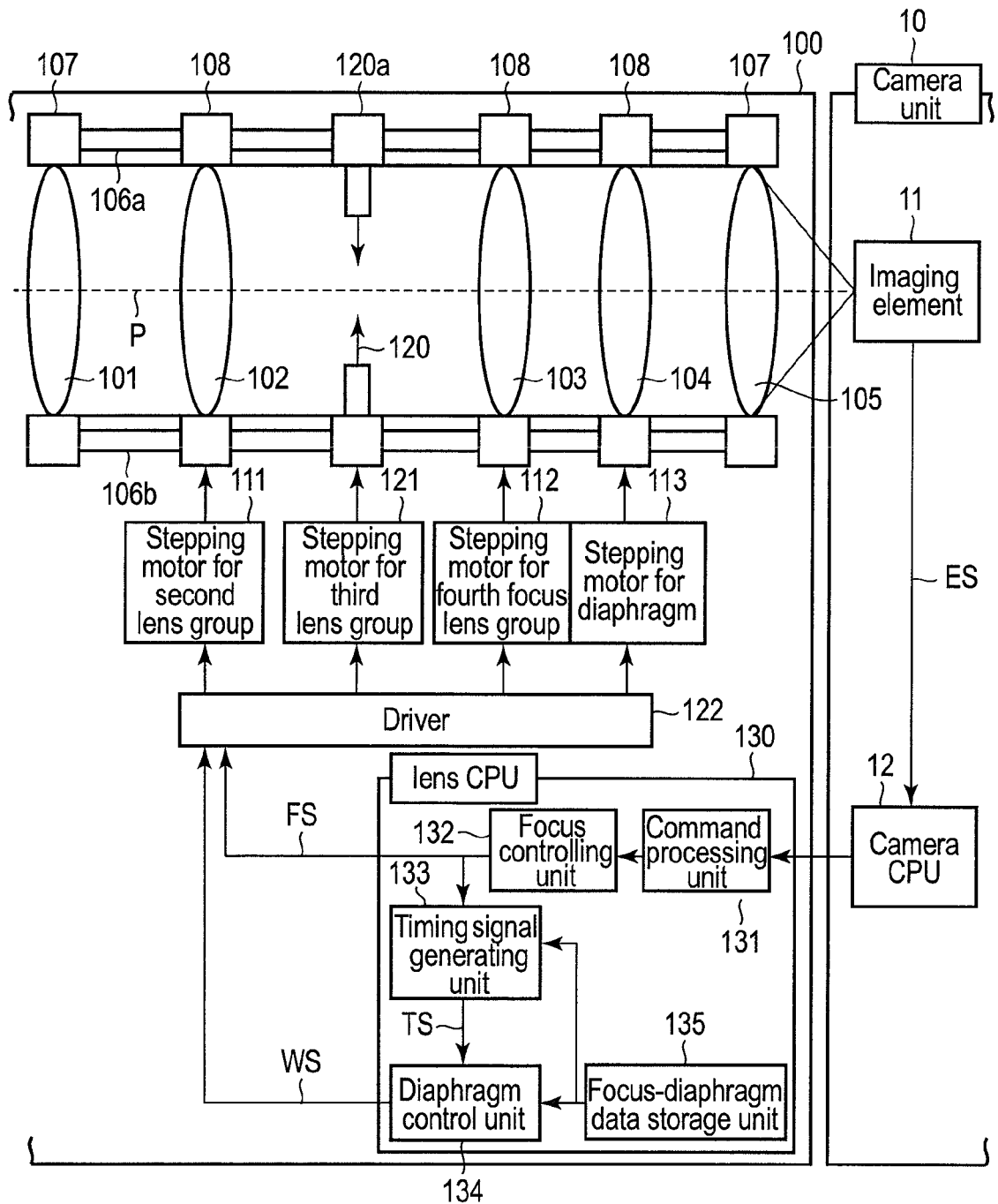
F I G. 1

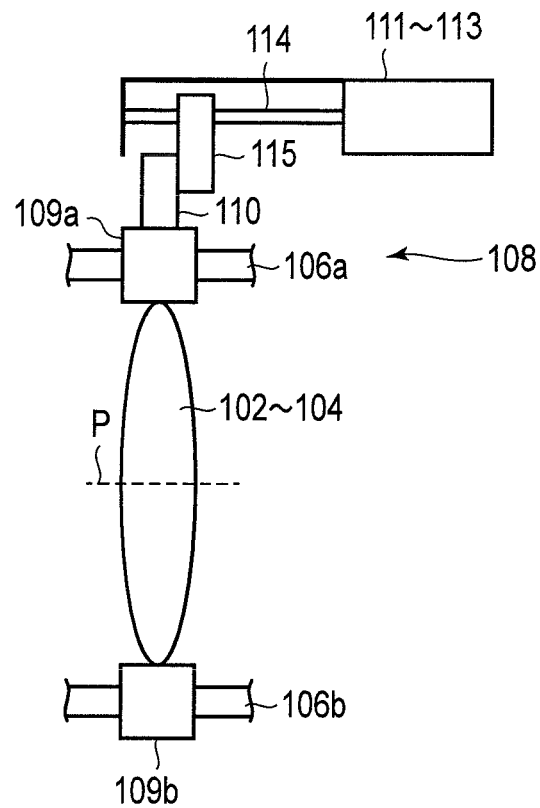
F I G. 2
Focus is at infinitely far position
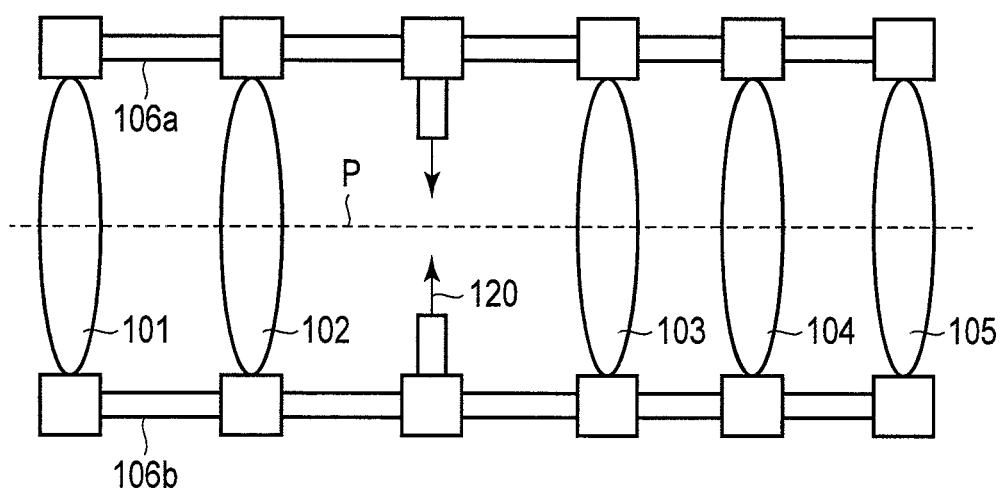
F I G. 3

Focus is at nearest position

| Optical distance | Position pulse of third stepping motor for third lens group (pls) | Aperture opening of diaphragm mechanism (AV_trc_pls) |
|---|---|---|
| Infinitely far | 0 | 0 |
| ~ |  | 1 |
|  |  | 2 |
|  | 140 | 3 |
|  | 150 | 4 |
|  | ... | ... |
| Nearest | 18000 | 200 |

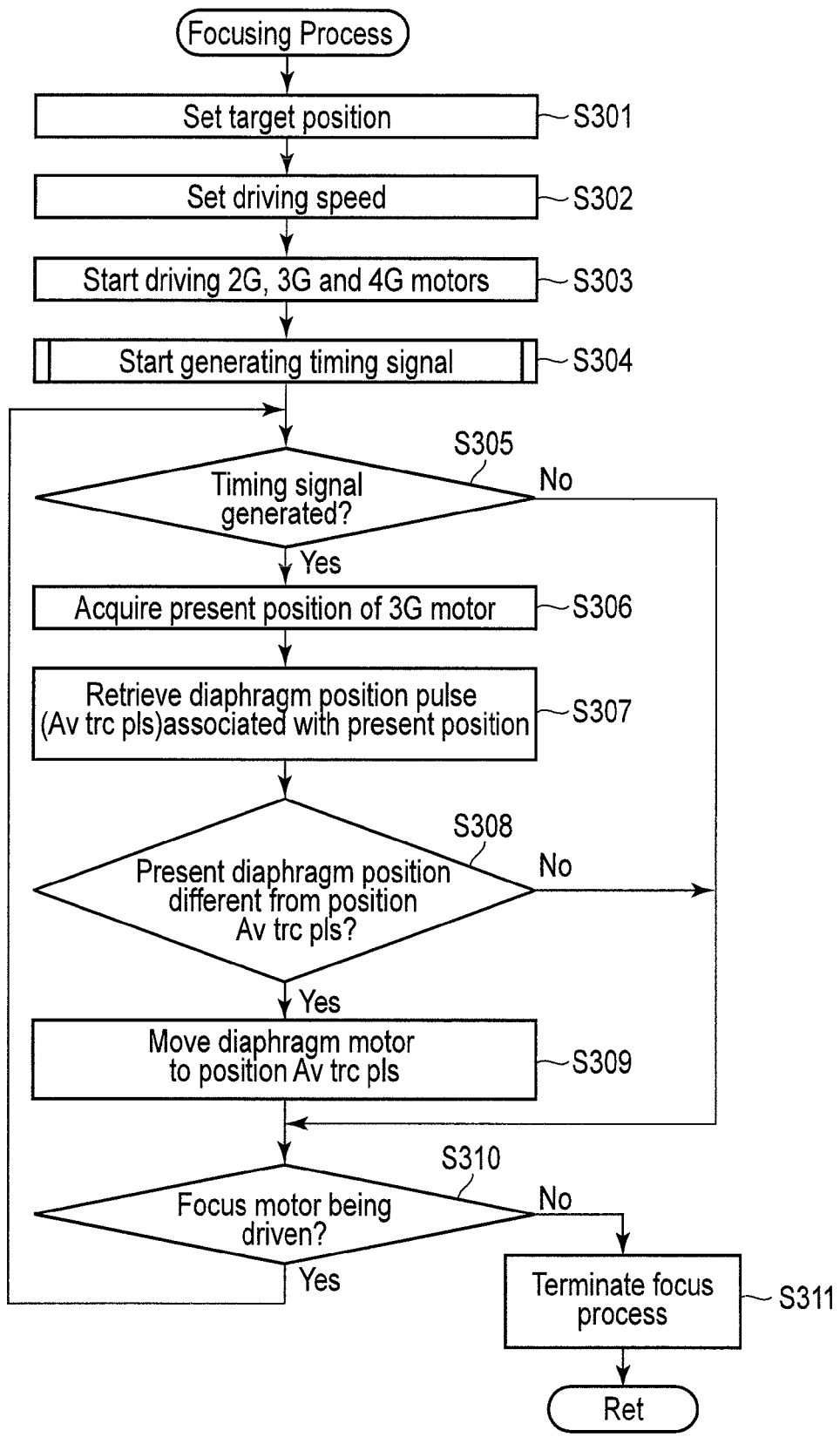
F I G. 10

| Optical distance | Position pulse (pls) of third stepping motor for third lens group | Aperture opening (Av trc pls) of diaphragm mechanism |
|---|---|---|
| Infinitely far | 0 | 0 |
| ~ |  | 2 |
|  | 150 | 4 |
|  | 170 | 6 |
|  | 190 | 8 |
|  | ... | ... |
| Nearest | 18000 | 200 |
F I G. 13
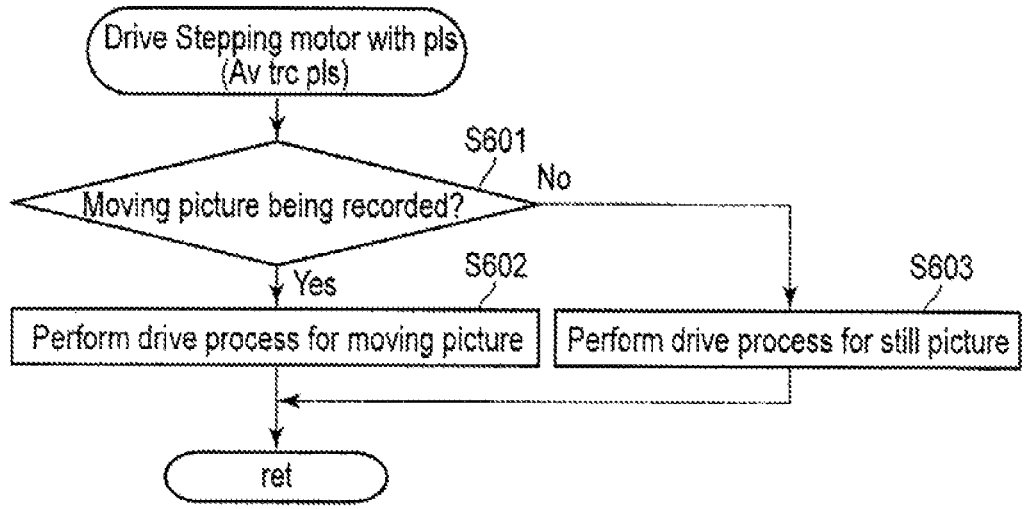
F I G. 14

| Zoom position | | Z1 | Z2 | ... | Zn |
|---|---|---|---|---|---|
| Aperture opening of diaphragm mechanism (AV_trc_pls) | Optical distance | Position pulse (pls) of stepping motor for third lens group | Position pulse (pls) | ... | Position pulse (pls) |
| 0 | Infinitely far | 0 | 0 | ⋮ | 0 |
| 1 | ~ | P11 | P21 | | Pn1 |
| 2 | | P12 | P22 | | Pn2 |
| 3 | | P13 | P23 | | Pn3 |
| 4 | | P14 | P24 | | Pn4 |
| ⋮ | | ⋮ | ⋮ | | ⋮ |
| m | Nearest | P1m | P2m | | Pnm |

FIG. 16

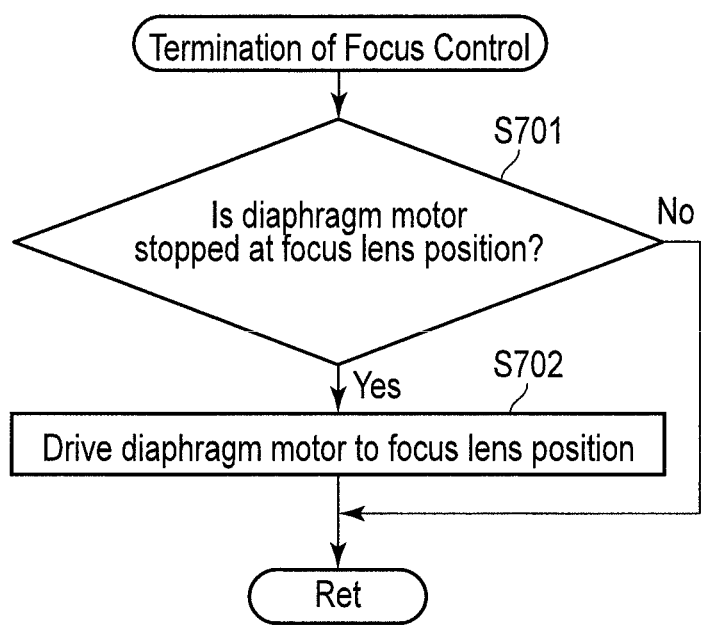
F I G. 17

US 8,909,036 B2

OPTICAL DEVICE

CROSS-REFERENCE TO RELATED APPLICATIONS

This application is based upon and claims the benefit of priority from prior Japanese Patent Application No. 2012-203605, filed Sep. 14, 2012, the entire contents of which are incorporated herein by reference.

BACKGROUND OF THE INVENTION

1. Field of the Invention

The present invention relates to an optical device such as an exchangeable lens unit comprising, for example, focus lens groups and a diaphragm mechanism.

2. Description of the Related Art

An optical system is available, which comprises focus lens groups and which can achieve macro photography. As is known, the F value changes as the focus lens groups move in the optical system. The change in the F value results from an optically inherent phenomenon that the luminous energy at image plane decreases as the photographing magnification is raised.

In this regard, Jpn. Pat. Appln. KOKAI Publication No. 11-231210 discloses a technique of keeping the F value unchanged even if the focus lens groups move. The optical system of Jpn. Pat. Appln. KOKAI Publication No. 11-231210 has a lens barrel in which the diaphragm is opened and closed by a cam mechanism driven as the focus lens groups move.

BRIEF SUMMARY OF THE INVENTION

An optical device according to an aspect of the present invention comprises: an optical system including a focus lens group; a diaphragm unit configured to limit a light beam passing through the optical system; a focus-lens driving unit configured to move the focus lens group along an optical axis of the optical system; a diaphragm driving unit configured to control an aperture opening of the diaphragm unit; and a diaphragm control unit configured to control the diaphragm driving unit in accordance with the position to which the focus lens group has been moved by the focus-lens driving unit, thereby controlling the aperture opening of the diaphragm unit.

A camera system according to another aspect of the present invention comprises an interchangeable lens having an optical system including a focus lens group, and a camera unit to which the interchangeable lens is detachably secured. The interchangeable lens includes a diaphragm unit configured to limit a light beam passing through the camera system, a focus-lens driving unit configured to move the focus lens group along an optical axis of the camera system, a diaphragm driving unit configured to control an aperture opening of the diaphragm unit, and a diaphragm control unit configured to control the diaphragm driving unit in accordance with the position to which the focus lens group has been moved by the focus-lens driving unit, thereby controlling the aperture opening of the diaphragm unit. The camera unit includes a control unit configured to perform communication with the interchangeable lens. The focus-lens driving unit moves the focus lens group in accordance with an instruction coming from the control unit of the camera unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing the configuration of a photographing apparatus using an optical device, which is an exchange lens according to the present invention;

FIG. 2 is a diagram showing the mechanism configured to move the second to fourth lens groups in the apparatus of FIG. 1;

FIG. 3 is a diagram showing the positions the second to fourth lens groups take if the focus position is infinitely far in the apparatus;

FIG. 10 is a flowchart showing how the focusing is performed in the apparatus;

FIG. 13 is a table showing the low-resolution data contained in the focus-diaphragm data stored in the focus-diaphragm data storage unit in the first modification of the apparatus;

FIG. 14 is a flowchart showing how the diaphragm driving motor is driven in a second modification of the apparatus;

FIG. 16 is a table showing the focus-diaphragm data used in a third modification of the apparatus; and FIG. 17 is a flowchart showing how the focusing is terminated in a fourth modification of the apparatus.

DETAILED DESCRIPTION OF THE INVENTION

Embodiment

Figure 4:
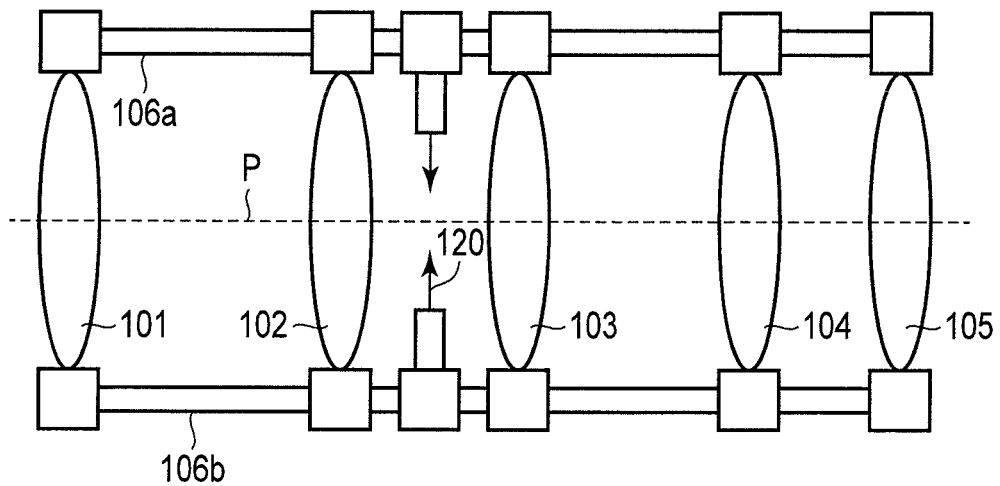
FIG. 4 is a diagram showing the positions the second to fourth lens groups take if the focus position is the nearest in the apparatus.

An embodiment of this invention will be described with reference to the accompanying drawing.

FIG. 1 shows the configuration of a photographing apparatus using an optical device. The photographing apparatus has the configuration of an interchangeable-lens system. The photographing apparatus comprises a camera unit 10, to which an interchangeable lens 100 (i.e., optical device) is detachably secured. The photographing apparatus may be used in combination not only with a camera with an exchange lens, but also with a mobile device having a photographing function.

The camera unit 10 converts the image of an object, focused by the interchangeable lens 100, to an electric signal, and then processes the electric signal, thereby generating image data representing a still picture or a moving picture. The camera unit 10 has an imaging element 11 and a camera CPU 12.

The imaging element 11 converts the image of the object, received through the interchangeable lens 100, to an electric signal.

The camera CPU 12 performs a contrast AF process and an AE process on the still picture or moving picture, and processes the electric signal output from the imaging element 11, thereby acquiring still picture data or moving picture data. The imaging processes the camera CPU 12 performs are, for example, color correction, gamma (γ) correction, data compression, and data expansion (i.e., expanding image data compressed).

In the contrast AF process, a high-frequency component is extracted from the image data acquired by the imaging element 11 that has photographed the object. The high-frequency component so extracted is integrated, obtaining a focusing evaluation value for AF. The contrast AF process thus evaluates the contrast of the image represented by the image data, from the focusing evaluation value obtained, adjusting the positions of the focus lens groups of the interchangeable lens 100. Here, the first lens group 101, third lens group 102 and fourth lens group 104 are thereby set to a focusing state.

In the AE process, the image data acquired in the imaging element 11 is used, calculating the luminance of the object. The aperture opening (i.e., value related to the FNO) a diaphragm mechanism 120 as at the time of exposure is calculated from the luminance of the object so calculated.

The camera unit 10 has a display and a console unit. The display is configured to display a still image or a moving picture. The console unit has a release button, a mode switch, a moving-picture recording button, a selection key, a power-supply button, etc. Neither the display nor the console unit is described here in detail.

The interchangeable lens 100 comprises, as a photographing-lens system, first to fifth lens groups 101 to 105. Each of the lens groups 101 to 105 (1G to 5G lens groups) is constituted by a plurality of optical lenses combined together. The first to fifth lens groups 101 to 105 focus the image of the object, on the image-forming surface of the imaging element 11. That is, lens groups 101 to 105 adjust the focusing the object. The fourth lens group 104 is provided as a first focus-lens group for wobbling at the time of adjusting the focus. The second lens group 102 and the third lens group 103 are used as a second focus-lens group for adjusting the focus.

For simplicity of description, the third lens group 103 used to adjust the focus will be described. Note that the fourth lens group 104 has a lower magnification than the first to third lens groups 101 to 103 and the fifth lens group 105.

The first lens group 101 and the fifth lens group 105 are secured to the housing of the interchangeable lens 100. The second to fourth lens groups 102 to 104 can move with respect to the housing along the optical axis P of the interchangeable lens 100.

The interchangeable lens 100 is incorporated a zoom lens system.

More specifically, the interchangeable lens 100 incorporates, for example, two suspending shafts 106a and 106b, which extend in parallel to each other. The first lens group 101 and the fifth lens group 105 are secured to two holding members 107, respectively, which are fastened to the suspending shafts 106a and 106b. The second to fourth lens groups 102 to 104 are secured to four holding members 108, respectively, which can slide on the suspending shafts 106a and 106b. Therefore, the second to fourth lens groups 102 to 104 can move along the optical axis P of the interchangeable lens 100.

FIG. 2 shows a drive mechanism 108 configured to move the second to fourth lens groups 102 to 104. The drive mechanism 108 comprises sliding members 109a and 109b, which slide on the suspending shafts 106a and 106b, respectively. The sliding members 109a and 109b of the drive mechanism 108 support the second to fourth lens groups 102 to 104. Of the sliding members, the sliding member 109a, for example, is fastened to a coupling member 110.

The drive mechanism 108 has stepping motors (2G to 4G motors) 111 to 113 for the second to fourth lens groups 102 to 104, respectively. The stepping motors 111 to 113 for moving the second to fourth lens groups have screw shafts 114, respectively. The screw shafts 114 extend in parallel to the optical axis P of the interchangeable lens 100. A sliding nut member 115 meshes with each screw shaft 114, and is coupled to the coupling member 110.

Therefore, the screw shafts 114 rotate as the stepping motors 111 to 113 are driven. As a result, the sliding nut members 115 slide on the screw shafts 114, in parallel to the optical axis P of the interchangeable lens 100. As they so slide, the sliding nut members 115 move the coupling members 110, which in turn slide the sliding members 109a and 109b on the suspending shafts 106a and 106b. Hence, the second to fourth lens groups 102 to 104 move along the suspending shafts 106a and 106b.

The diaphragm mechanism 120 is provided between the second lens group 102 and the third lens group 103. The diaphragm mechanism 120 is secured to a support member 120a mounted on the suspending shafts 106a and 106b. It is therefore supported on the suspending shafts 106a and 106b. To the diaphragm mechanism 120, a stepping motor 121 is connected and used as diaphragm-driving unit. The stepping motor 121 drives the diaphragm mechanism 120 to change the aperture opening.

The stepping motor 121 and the stepping motors 111 to 113 for the second to fourth lens groups are connected to a driver 122, which is in turn connected to a lens CPU 130.

On receiving a command from the camera CPU 12, the lens CPU 130 supplies, for example, a focus control signal FS and a diaphragm control signal WS to the driver 122 in order to perform an AF process in accordance with the command. More precisely, the lens CPU 130 outputs control signals FS and WS. The focus signal FS drives the second to fourth stepping motors 111 to 113, and the signal WS drives the stepping motor 121. Thus, the lens CPU 130 locates the second to fourth lens groups 102 to 104 at the respective focusing positions, and controls the aperture opening of the diaphragm mechanism 120.

The lens CPU 130 has a memory such as a RAM. The RAM holds the data (i.e., position pulses pls) representing the positions the third lens group 103 assumes at present, and the data representing the aperture opening the diaphragm mechanism 120 has at present.

The focus control signal FS contains data representing the position of the third lens group 103 and the speed at which the third lens group 103 moves. The diaphragm control signal WS contains data representing the aperture opening of the diaphragm mechanism 120. The focus control signal FS further contains focus control signals for the second to fourth stepping motors 111 to 113.

FIG. 3 shows the positions the second to fourth lens groups 102 to 104 take if the focus position is infinitely far (Far) in the apparatus. FIG. 4 shows the positions the second to fourth lens groups 102 to 104 take if the focus position is the nearest (Near) in the apparatus. If the focus position is infinitely far, the lenses of the second and third groups 102 and 103 are controlled in position, or moved away from the diaphragm mechanism 120. On the other hand, if the focus position is the nearest, the lenses of the second and third groups 102 and 103 are controlled in position, or moved toward the diaphragm mechanism 120.

The lens CPU 130 includes a command processing unit 131, a focus controlling unit 132, a timing signal generating unit 133, and a diaphragm control unit 134, in order to perform a focusing process. The lens CPU 130 incorporates a focus-diaphragm data storage unit 135. The focus-diaphragm data storage unit 135 stores focus-diaphragm data that represents the relation between the focus position and the diaphragm position.

The command processing unit 131 receives a command from the camera CPU 12 and processes the command, converting the same to a command signal that is easy to process. The control signal transmitted from the camera CPU 12 contains a focus control command, a diaphragm control instruction, and a sync signal. The focus control command specifies the amount of move, the direction and speed (lens speed) in and at which to move the second and third lens groups 102 and 103.

The focus controlling unit 132 receives the command signal from the command processing unit 131. It then supplies the focus control signal FS to the driver 122 in order to perform a focusing process in accordance with the command signal coming from the command processing unit 131. The focus control signal FS is composed of drive pulses, which cause the driver 122 to drive the second and third lens groups 102 and 103.

Figure 5:
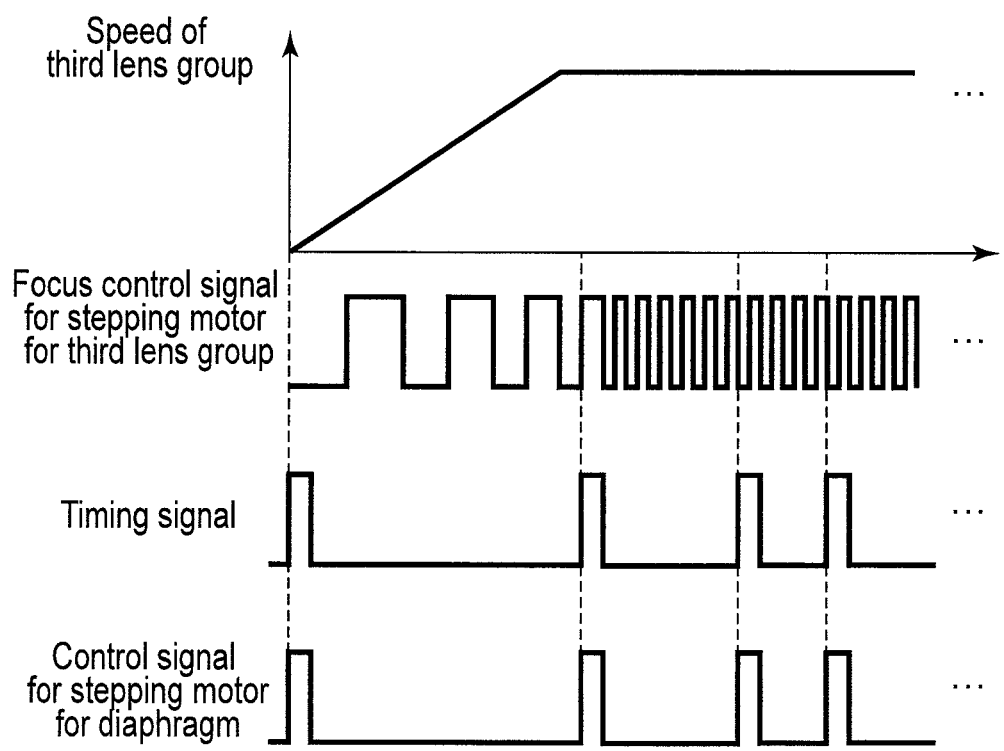
FIG. 5 is a chart showing the timing at which the diaphragm control unit generates a diaphragm control signal in the apparatus.

FIG. 5 shows how the speed at which the third lens group 103 moves changes as the focus controlling unit 132 inputs drive pulses, i.e., focus control signal FS to the driver 122 for the stepping motor 112 driving the third lens group 103, and also shows how the timing signal generating unit 133 generates a timing signal TS in response to the drive pulses, i.e., focus control signal FS for the stepping motor 112 driving the third lens group 103. FIG. 5 further shows how the diaphragm control unit 134 generates a diaphragm control signal WS in response to the timing signal. Note that the second lens group 102 and the fourth lens group 104 are controlled in the same way as the third lens group 103 is so controlled as shown in FIG. 5.

As FIG. 5 shows, the focus controlling unit 132 generates drive pulses to control the speed of the third lens group 103 immediately after and in the third lens group 103 starts moving. Immediately after the second and third lens groups 102 and 103 have started moving, they may move at a low speed. In this case, the focus controlling unit 132 increases the width of the drive pulses. As the lens speed increases, the focus controlling unit 132 decreases the width of the drive pulses. Since the second and third lens groups 102 and 103 are controlled in unison, the control of the third lens group 103 only will be hereinafter explained.

The timing signal generating unit 133 generates a timing signal TS from the drive pulses constituting the focus control signal FS supplied from the focus controlling unit 132. As seen from FIG. 5, the timing signal rises to a high level in accordance with the number of drive pulses constituting the focus control signal FS for the stepping motor 112 that drives the lenses of the third lens group 103.

When the timing signal generated by the timing signal generating unit 133 rises to the high level as shown in FIG. 5, the diaphragm control unit 134 reads the focus-diaphragm data stored in the focus-diaphragm data storage unit 135. In accordance with the focus-diaphragm data so read, the diaphragm control unit 134 supplies the diaphragm control signal WS to the driver 122.

Figures 6, 7:
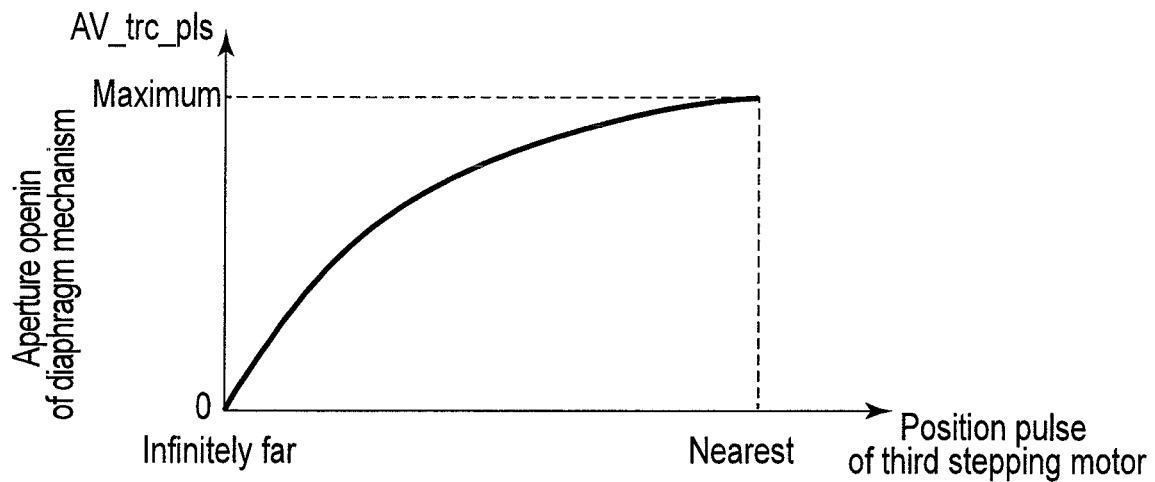
FIG. 6 is a graph showing the relation the aperture opening of the diaphragm mechanism has with the position the third lens group takes between the infinitely far and nearest positions in the apparatus.
FIG. 7 is a table showing the focus-diaphragm data stored in the focus-diaphragm data storage unit in the apparatus.

FIG. 6 shows the relation the aperture opening (Av trc pls) of the diaphragm mechanism 120 has with the position the third lens group 103 (i.e., position of the third stepping motor 112) takes between the infinitely far position and the nearest position. The positions the lenses of the third group 103 take are indicated by the position pulses (pls) of the stepping motor 112 for the third lens group 103. The aperture opening of the diaphragm mechanism 120 is the smallest at the infinitely far position of the third lens group 103 (that is, the diaphragm value, FNO is maximal). The aperture opening gradually increases toward the nearest lens position. At the nearest lens position, the aperture opening is the largest (that is, the diaphragm value, FNO is minimal). In FIG. 6, the aperture opening of the diaphragm mechanism 120 is minimal (0) when the third lens group 103 is at the infinitely far position, and is maximal when the third lens group 103 is at the nearest position.

FIG. 7 is a table showing the focus-diaphragm data stored in the focus-diaphragm data storage unit 135. The focus-diaphragm data represents the relation of the position pulse (pls) of the stepping motor 112 for the third lens group 103 and the aperture opening (AV trc pls) of the diaphragm mechanism 120, used as drive data for the diaphragm mechanism 120. The position pulse (pls) of the stepping motor 112 for the third lens group 103 is corresponding to the optical distance (ranging from 0 at the infinitely far position, to the distance between the infinitely far position and the nearest position). This relation agrees with the relation the aperture opening of the diaphragm mechanism 120 has with the lens position (i.e., position of the third lens group 103) existing between the infinitely far position and nearest position of the third lens group 103, both of which are shown in FIG. 6.

The aperture opening data, which is contained in the focus-diaphragm data, is recorded in units of minimum values by which to change the opening of the diaphragm mechanism 120. The minimum value is the fewest pulses that can drive the stepping motor 121, for example one pulse.

If the interchangeable lens 100 incorporates a zoom lens system, the focus-diaphragm data, which is stored in the focus-diaphragm data storage unit 135, represents the relation that the aperture opening of the diaphragm mechanism 120 has with the position of the stepping motor 112 for the third lens group 103, corresponding to the position of the zoom lens.

In the embodiment, the timing signal is generated to control the pulses for the third lens group 103. Nonetheless, the timing signal may control the pulses for the second lens group 102 instead. That is, the timing signal may control the pulses for any lens group that can be moved from the infinitely far position to the nearest position.

In this apparatus, the diaphragm control unit 134 controls the diaphragm mechanism 120, ultimately controlling the aperture opening of the mechanism 120, in accordance with the position the third lens group 103 assumes after being moved by the stepping motor 112.

That is, the diaphragm control unit 134 controls the diaphragm mechanism 120, setting the aperture opening of the mechanism 120, in accordance with the position of the third lens group 103 on the basis of the focus-diaphragm data stored in the focus-diaphragm data storage unit 135. The aperture opening of the mechanism 120 is set in units of minimum values by which to change the opening of the diaphragm mechanism 120, i.e., fewest pulses for the stepping motor 121, for example one pulse.

More specifically, the timing signal generating unit 133 refers to the position pulses of the stepping motor 112 for the third lens group 103, which are focus-diaphragm data (FIG. 7) stored in the focus-diaphragm data storage unit 135, and also to the data representing the aperture opening of the diaphragm mechanism 120, which is associated with these position pulses. The timing signal generating unit 133 thus monitors the position pulses of the stepping motor 112 for the third lens group 103. When any pulse is found to be identical to a position pulse set in the focus-diaphragm data (FIG. 7), the timing signal generating unit 133 generates a timing signal TS.

On receiving the timing signal TS from the timing signal generating unit 133, the diaphragm control unit 134 generates a diaphragm control signal WS for controlling the aperture opening of the diaphragm mechanism 120, on the basis of that aperture opening of the diaphragm mechanism 120, which is set in the data (FIG. 7) and which is associated with the position pulse of the stepping motor 112.

At this point, the diaphragm control unit 134 sets the speed at which the stepping motor 121 changes the aperture opening of the diaphragm mechanism 120, to a value proportional to the speed at which the third lens group 103 is moving.

Figure 8:
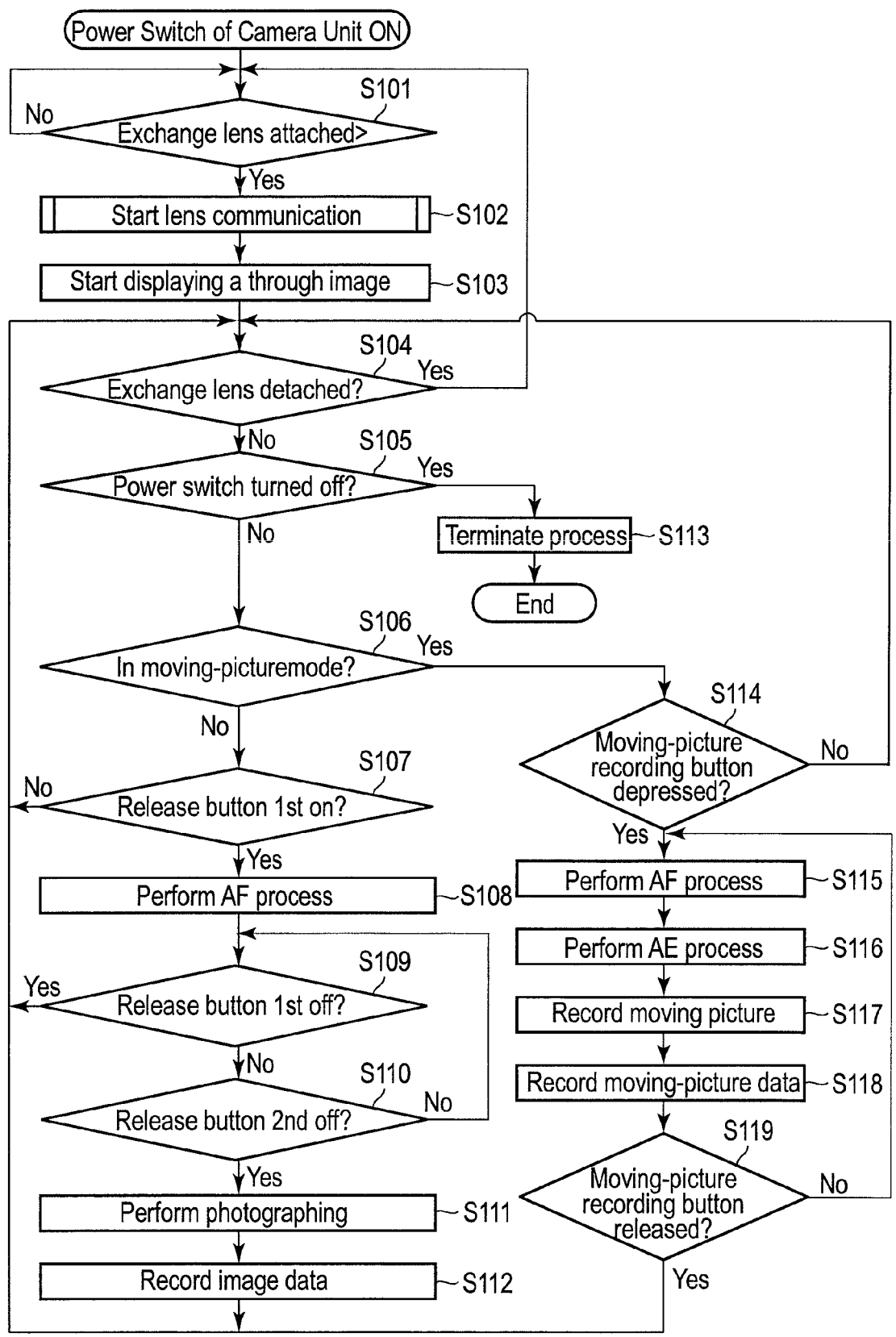
FIG. 8 is a flowchart showing how the camera power supply is turned on in the apparatus.

How the apparatus configured as described above operates will be explained with reference to FIG. 8, which is a flowchart showing how the camera power supply is turned on.

In Step S101, the camera CPU 12 determines whether the interchangeable lens 100 has been attached to the camera unit 10. More precisely, the camera CPU 12 determines whether the interchangeable lens 100 has been mechanically connected to the camera unit 10. This decision may be made by means of communication between the camera CPU 12 and the lens CPU 130 of the interchangeable lens 100.

If the interchangeable lens 100 is found secured to the camera unit 10, the camera CPU 12 communicates with the lens CPU 130 of the interchangeable lens 100 in Step S102, initializing the positions of the first to fifth lens groups 101 to 105. In Step S103, the camera CPU 12 causes the display to display the through image (live-view image) of the object.

To display the through image of the object, the camera CPU 12 communicates with the lens CPU 130 of the interchangeable lens 100 and releases the diaphragm mechanism 120, and the imaging element 11 starts photographing the object. The camera CPU 12 then stores the image data acquired by the imaging element 11, one frame after another. Next, the camera CPU 12 performs an imaging process on the image data, generating data representing the through image (live-view image) of the object. The imaging process is repeated, whereby the display displays the through image of the object.

In Step S104, the camera CPU 12 determines whether the interchangeable lens 100 has been detached from the camera unit 10. If the interchangeable lens 100 is found detached, the camera CPU 12 returns to Step 101.

In Step S105, the camera CPU 12 determines whether the power switch on the camera unit 10 has been turned off. If the power switch is found not off, the camera CPU 12 determines, in Step S106, whether the camera unit 10 is operating in the moving-picture mode.

If the camera unit 10 is found not operating in the moving-picture mode, the camera CPU 12 determines that the camera unit 10 is operating in the still-picture mode. In this case, camera CPU 12 determines, in Step S107, whether the release button has been half depressed (1st: ON) or not. If the release button is found half depressed, the camera CPU 12 performs the AF process in Step S108. In Step S109, the camera CPU 12 determines whether the release button is no longer half depressed (2nd: OFF). If the release button is found still half depressed, the camera CPU 12 determines, in Step S110, whether the release button has been fully depressed (2nd: ON). If the release button is found fully depressed, the camera CPU 12 performs a photographing process in Step S111, processing the electric signal ES output from the imaging element 11, thereby generating still-picture data. In Step S112, the camera CPU 12 stores the still-picture data.

In Step S106, the camera CPU 12 may determine that the camera unit 10 is operating in the moving-picture mode. In this case, the camera CPU 12 determines, in Step S114, whether the moving-picture recording button has been depressed or not. If the moving-picture recording button is found depressed, the camera CPU 12 performs the AF process on the object in Step S115. Next, the camera CPU 12 performs the AE process on the object in Step S116. In Step S117, the camera CPU 12 processes the electric signal ES output from the imaging element 11, acquiring moving-picture data. In Step S118, the camera CPU 12 stores the moving-picture data.

In Step S119, the camera CPU 12 determines whether the moving-picture recording button has been released. If the moving-picture recording button is found still depressed, the camera CPU 12 returns to Step S115, operating the camera 10 in the moving-picture mode.

Figure 9:
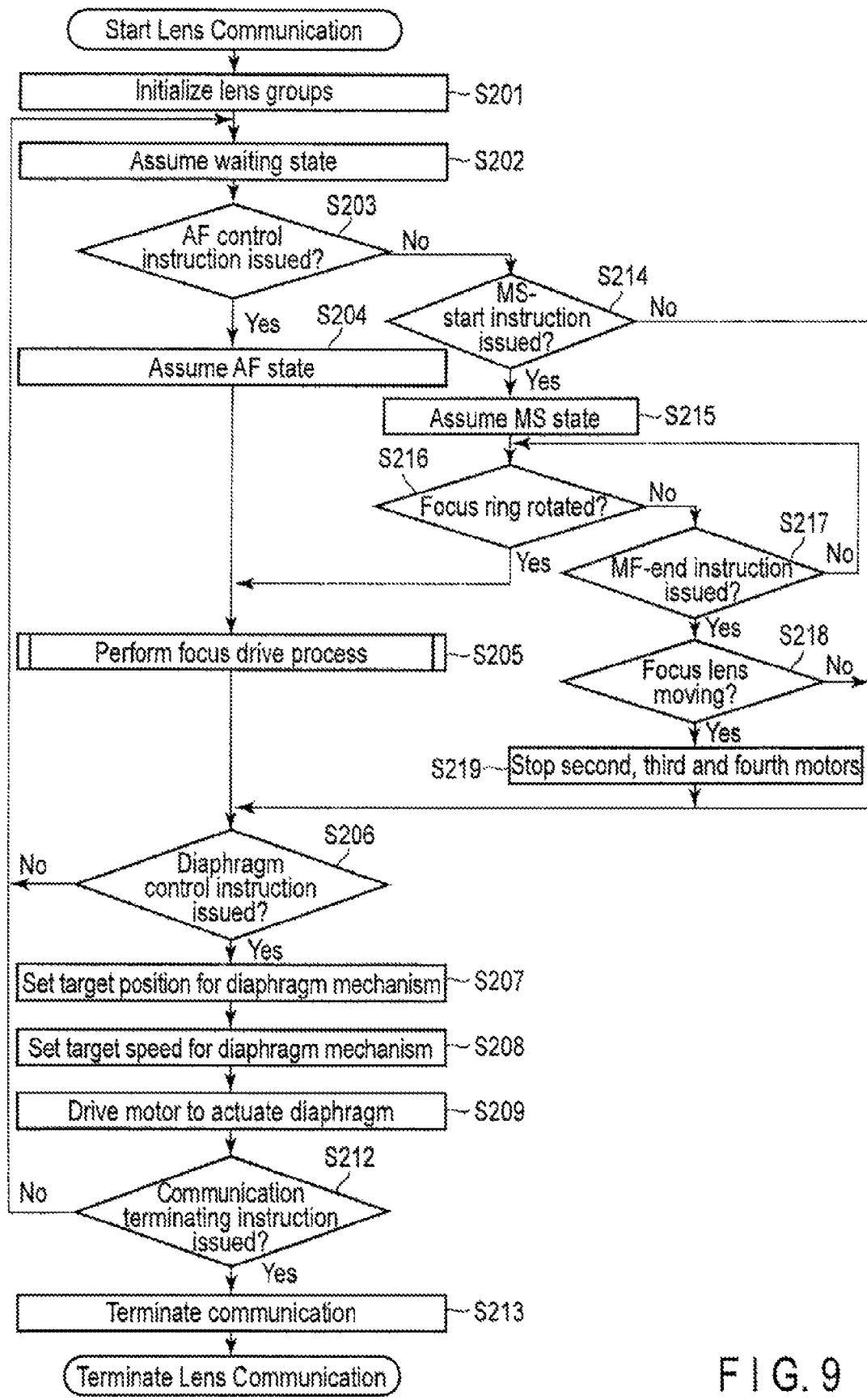
FIG. 9 is a flowchart showing how the lens communication is started in the apparatus.

How the lens CPU 130 operates to start the lens communicating in Step S102 will be explained with reference to the flowchart of FIG. 9. The flowchart of FIG. 9 is presented as the subroutine of Step S102, for the sake convenience. In practice, the lens CPU 130 operates independently of, and at the same time as, the lens CPU 12.

In Step S201, the lens CPU 130 initializes the first to fifth lens groups 101 to 105 in terms of position. In Step S202, the lens CPU 130 assumes a waiting state. To initialize the lens groups in position, the lens CPU 130 may read the focus-diaphragm data (FIG. 7) stored in the focus-diaphragm data storage unit 135, and may then store the focus-diaphragm data storage unit 135 in a RAM or the like. Note that the focus-diaphragm data is composed of the position pulses for the stepping motor 112 for the third lens group 103, and the data representing the aperture opening associated with the position pulses, which the diaphragm mechanism 120 should have.

In Step S203, the lens CPU 130 determines whether the camera CPU 12 has issued an AF control instruction. If the camera CPU 12 has issued the AF control instruction, the lens CPU 130 assumes the AF state in Step S204. In Step S205, the focus controlling unit 132 performs a focus drive process, supplying a focus control signal FS via the driver 122 to the second to fourth stepping motors 111 to 113, causing the stepping motors 111 to 113 to achieve the automatic focusing (AF).

In Step S206, the lens CPU 130 determines whether a diaphragm control instruction has been issued to the diaphragm mechanism 120. If the diaphragm control instruction has been issued, the diaphragm control unit 134 sets, in Step S207, a target position to which the diaphragm mechanism 120 should be moved. In Step S208, the diaphragm control unit 134 sets a target speed at which the diaphragm mechanism 120 should be moved. In Step S209, the diaphragm control unit 134 generates a diaphragm control signal WS for moving the diaphragm mechanism 120 to the target position at the target speed. The diaphragm control signal WS is supplied via the driver 122 to the stepping motor 121, driving the stepping motor 121.

The diaphragm is controlled in one way in accordance with the diaphragm control instruction, and in another way in the focus drive process performed in Step S205. In the focus drive process performed in Step S205, the diaphragm control unit 134 controls the aperture opening of the diaphragm mechanism 120 in response to the timing signal TS generated by the timing signal generating unit 133, in accordance with the focus-diaphragm data (FIG. 7) stored in the focus-diaphragm data storage unit 135.

By contrast, the diaphragm is controlled not in response to such a timing signal, but is quickly driven in accordance with a diaphragm control instruction coming from the camera CPU 12, irrespective of any timing signal.

The target position of the diaphragm, specified by the diaphragm control instruction coming from the camera CPU 12, is managed independently of the target position calculated from the focus-diaphragm data (FIG. 7). The target position of the diaphragm, specified by the diaphragm control instruction, is the sum of the "the target position specified by the camera CPU 12" and the "target position calculated from the focus-diaphragm data."

The target position specified by the camera CPU 12 is associated with the aperture opening that the diaphragm has at the indefinitely far position Fno (i.e., F value (Fno)). The target position calculated from the focus-diaphragm data (FIG. 7) is associated with the deviation of the aperture opening at the position of the focus lens group, from the aperture opening at the indefinitely far position Fno, which is the reference aperture opening.

In Step S212, the lens CPU 130 determines whether the camera CPU 12 has issued a communication terminating instruction. If the camera CPU 12 has not issued the communication terminating instruction, the lens CPU 130 returns to Step S202 and repeats Steps S202 to S212.

If the camera CPU 12 has issued the communication terminating instruction, the lens CPU 130 terminates the lens communication in Step S213.

In Step S203, the lens CPU 130 may determine that the camera CPU 12 has not issued an AF control instruction. In this case, the lens CPU 130 determines whether the camera CPU 12 has issued a manual-focusing (MF) start instruction. If no MF start instructions have been issued, the lens CPU 130 assumes an MF state in Step S215. In Step S216, the lens CPU 130 determines whether the focus ring (not shown) has been rotated or not. If the focus ring is found to have been rotated, the lens CPU 130 goes to Step S205, performing the focus drive process. If the focus ring is found not rotated, the lens CPU 130 determines, in Step S217, whether an MF terminating instruction has been issued. If the an MF terminating instruction has been issued, the lens CPU 130 determines, in Step S218, whether the second to fourth lens groups 102 to 104, i.e., focus lenses, have been rotated in unison with the focus ring. If the second to fourth lens groups 102 to 104 are found so rotated, the lens CPU 130 stops, in Step S219, the stepping motors 111 to 113 for moving the second to fourth lens groups 102 to 104.

How the apparatus performs the focus drive process (Step S205) will be explained with the flowchart of FIG. 10.

In Step S301, the focus controlling unit 132 sets target positions for the lenses of the second to fourth lens groups 102 to 104. In Step S302, the focus controlling unit 132 sets the speed at which to move the second to fourth lens groups 102 to 104. In Step S303, the focus controlling unit 132 supplies a focus control signal FS via the driver 122 to the stepping motors 111 to 113 for moving the second to fourth lens groups. In response to the focus control signal FS, the stepping motors 111 to 113 start driving the second to fourth lens groups 102 to 104.

In Step S304, the timing signal generating unit 133 generates such a timing signal TS as shown in FIG. 5, from the drive pulses FS of the timing signal generating unit 133 supplied from the focus controlling unit 132. The timing signal TS generated by the timing signal generating unit 133 rises to the high level at intervals that accord with the speed of the third lens group 103 and with the widths of the pulses of the focus control signal FS. How the timing signal TS is generated will be explained later in detail with reference to FIG. 11.

In Step S305, the focus controlling unit 132 determines whether the timing signal generating unit 133 has generated the timing signal TS. If the unit 133 has generated the timing signal TS, the focus controlling unit 132 acquires, in Step S306, the data representing the present position of the stepping motor 112 for the third lens group 103.

In Step S307, the diaphragm control unit 134 retrieves the aperture opening of the diaphragm mechanism 120, which corresponds to the present position of the stepping motor 112, from the data (FIG. 7) representing the position of the stepping motor 112 for the third lens group 103 and the aperture opening of the diaphragm mechanism 120.

In Step S308, the diaphragm control unit 134 compares the present aperture opening of the diaphragm mechanism 120 with the aperture opening retrieved from the data (FIG. 7) that has been read from the focus-diaphragm data storage unit 135. Thus, the diaphragm control unit 134 determines whether the present aperture opening of the diaphragm mechanism 120 differs from the aperture opening retrieved from the data (FIG. 7).

If the present aperture opening of the diaphragm mechanism 120 differs from the aperture opening retrieved, the diaphragm control unit 134 goes to Step S309. In Step S309, the diaphragm control unit 134 sets, as target position, the aperture opening retrieved from the data (FIG. 7) read from the focus-diaphragm data storage unit 135. The diaphragm control unit 134 supplies the diaphragm control signal WS via the driver 122 to the stepping motor 121, driving the stepping motor 121.

In Step S310, the focus controlling unit 132 determines whether the first to fourth stepping motors 111 to 113 are being driven or not. If the first to fourth stepping motors 111 to 113 are being driven, the focus controlling unit 132 returns to Step S305. If the first to fourth stepping motors 111 to 113 are not being driven, the focus controlling unit 132 terminates the focus drive process in Step S311.

Figure 11:
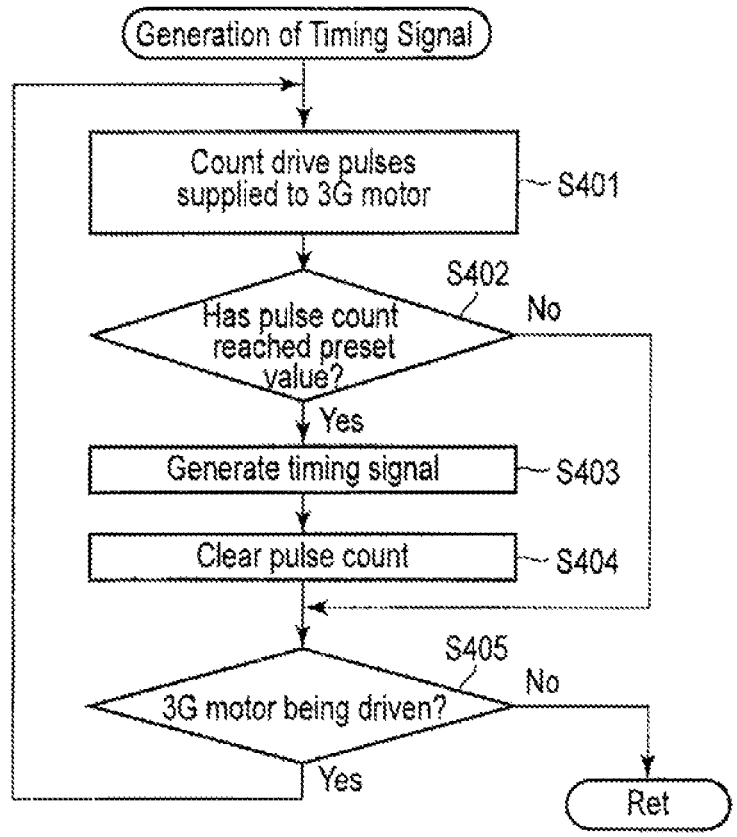
FIG. 11 is a flowchart showing how a timing signal is generated in the apparatus.

The process of generating a timing signal (i.e., Step S304) will be explained with reference to the flowchart of FIG. 11.

In Step S401, the timing signal generating unit 133 reads the focus control signal, which will be supplied to the stepping motor 112 for the third lens group, from the focus control signal FS output from the focus controlling unit 132. The timing signal generating unit 133 then counts the drive pulses constituting the focus control signal.

In Step S402, the timing signal generating unit 133 determines whether the number of drive pulses has reached a preset count value. The preset count value represents the position (FIG. 7) of the stepping motor 112 for the third lens group read from the focus-diaphragm data storage unit 135. The position data about the stepping motor 112 for the third lens group is associated with the aperture opening data about the diaphragm mechanism 120. If the number of drive pulses is found to have reached the preset count value, the timing signal generating unit 133 generates the timing signal TS in Step S403. In Step S404, the timing signal generating unit 133 clears the count value of drive pulses.

In Step S405, the timing signal generating unit 133 determines whether the stepping motor 112 for the third lens group is being driven or not. If the stepping motor 112 is found driven, the timing signal generating unit 133 will return to Step S401.

In the embodiment described above, the focus-diaphragm data storage unit 135 stores the focus-diaphragm data, which represents the relation between the aperture opening of the diaphragm mechanism 120 and the position pulses (pls) of the stepping motor 112 for the third lens group 103 for the optical distance between the infinitely far position and the nearest position. The diaphragm control unit 134 reads the focus-diaphragm data from stored in the focus-diaphragm data storage unit 135, in accordance with the timing signal generated from the focus control signal FS. Then, the diaphragm control unit 134 outputs a diaphragm control signal WS based on the focus-diaphragm data, thereby controlling the aperture opening of the diaphragm mechanism 120. In other words, the aperture opening of the diaphragm mechanism 120 is controlled in accordance with the position of the stepping motor 112 for the third lens group 103. In the embodiment, the aperture opening can therefore be electrically controlled as the focusing lens groups are moved, without using any cam mechanisms. Hence, the interchangeable lens 100 can be a small optical apparatus that does not require a large space.

The opening aperture of the diaphragm mechanism 120 is controlled in units of minimum values, or fewest pulses that drive the stepping motor 121, for example one pulse. Therefore, the noise the diaphragm mechanism 120 makes as it moves can be reduced, and the aperture opening of the diaphragm mechanism 120 can be controlled with high precision.

In the embodiment, the data representing the present position (i.e., position pulses pls) of the third lens group 103 and present aperture opening of the diaphragm mechanism 120 is read from the RAM provided in the lens CPU 130, and the target aperture opening of the diaphragm mechanism 120 is read from the focus-diaphragm data storage unit 135. If the present aperture opening of the diaphragm mechanism 120 differs from the target aperture opening of the diaphragm mechanism 120, a diaphragm control signal WS is generated from the difference between the present aperture opening and the target aperture opening. The motion of the diaphragm mechanism 120 is thereby minimized, reducing the noise the diaphragm mechanism 120 makes as it moves.

In the embodiment described above, the focus-diaphragm data stored in the focus-diaphragm data storage unit 135 is read in accordance with the timing signal generated from the focus control signal FS for the third lens group 103, and the aperture opening of the diaphragm mechanism 120 is controlled by a diaphragm control signal based on the focus-diaphragm data. The apparatus is not limited to this configuration, nevertheless. If the interchangeable lens 100 incorporates a zoom lens system, the zoom data, such as the magnification for the zoom lens system, may be read in accordance with the timing signal generated from the focus control signal FS. In this case, a zoom control signal may be generated from the zoom data and may control the zoom lens system.

[First Modification]

The first modification of the embodiment described above will be described.

As shown in the focusing-process flowchart of FIG. 10, the diaphragm control unit 134 retrieves, in Step S307, the aperture opening of the diaphragm mechanism 120, which corresponds to the present position of the stepping motor 112 for the third lens group, from the data read from the focus-diaphragm data storage unit 135 and representing the position of the stepping motor 112 for the third lens group and the aperture opening of the diaphragm mechanism 120. That is, in Step S307 the diaphragm control unit 134 retrieves the aperture opening (Av trc pls) the diaphragm mechanism 120 has at present. In the first modification, the aperture opening is retrieved as shown in the flowchart of FIG. 12.

Figure 12:
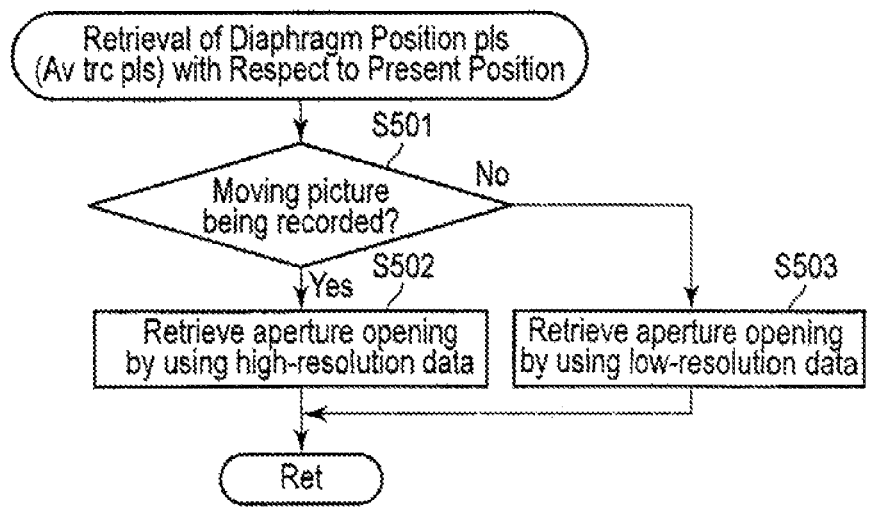
FIG. 12 is a flowchart showing how the diaphragm position is detected in a first modification of the apparatus.

As shown in FIG. 12, the diaphragm control unit 134 determines, in Step S501, whether the camera unit 10 is recording a moving picture (or whether it is operating in the moving-picture mode). If the camera unit 10 is recording a moving picture (or operating in a moving picture), the diaphragm control unit 134 retrieves the aperture opening in Step S502, using the high-resolution data shown in FIG. 7.

If the camera unit 10 is not recording a moving picture (or is operating in the still-picture mode), the diaphragm control unit 134 retrieves the aperture opening in Step S503, using the low-resolution data contained in the focus-diaphragm data shown in FIG. 13. The focus-diaphragm data shown in FIG. 13 is stored in the focus-diaphragm data storage unit 135. This focus-diaphragm data is drive data for the focus lens groups of the interchangeable lens 100, and represents the relation that the position pulses (pls) of the stepping motor 112 for the third lens group 103 over the optical distance between the infinitely far position and nearest position has with the aperture opening (Av trc pls) of the diaphragm mechanism 120. This relation agrees with the relation the aperture opening of the diaphragm 120 has, as shown in FIG. 6, with the position the third lens group 103 takes between the infinitely far position and nearest position (i.e., the position of the stepping motor 112 for the third lens group).

The low-resolution data (for use in the still-picture mode) contained in the focus-diaphragm data is a table showing the position pulses (pls) of the stepping motor 112 for the third lens group. Each position pulse shown in the table corresponds to two pulses for controlling the aperture opening (Av trc pls) of the diaphragm mechanism 120. The position pulses (pls) of the stepping motor 112 are at intervals longer than the pulses driving the diaphragm mechanism 120, which is controlled by one pulse each time. This is because the control speed has priority over the control precision in the still-picture mode, unlike in the moving-picture mode. As described above, the aperture opening of the diaphragm mechanism 120 is changed by two pulses each time. Instead, it may be controlled each time by any number of pulses, such as three pulses or four pulses. Thus, the diaphragm controlling speed is important in the still-picture mode, and the diaphragm controlling precision is important in the moving-picture mode.

[Second Modification]

The second modification of the embodiment described above will be described.

As shown in the focusing process flowchart of FIG. 10, the diaphragm control unit 134 supplies, in Step S309, a diaphragm control signal WS via the driver 122 to the stepping motor 121, driving the stepping motor 121 to change the aperture opening of the diaphragm mechanism 120 to the target value retrieved from the data (FIG. 7) read from the focus-diaphragm data storage unit 135.

In the second modification, the focusing process is performed as shown in the flowchart of FIG. 14, by driving the stepping motor 121 with position pulses pls (Av trc pls).

In Step S601, the diaphragm control unit 134 determines whether the camera unit 10 is recording a moving picture (operating in the moving-picture mode). If the camera unit 10 is recording a moving picture, the diaphragm control unit 134 performs, in Step S602, such a drive process as shown in FIG. 15 is performed.

Figure 15:
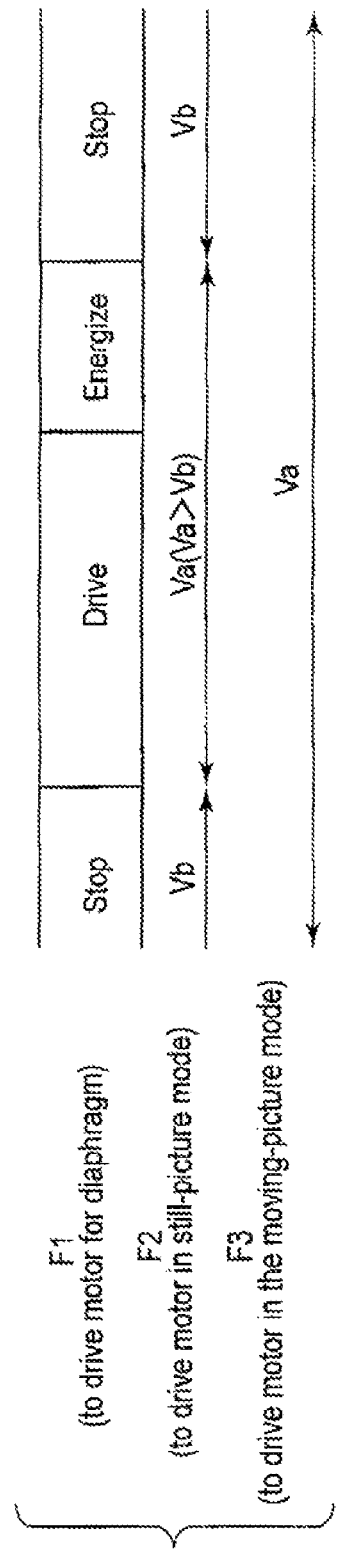
FIG. 15 is a diagram showing how the stepping motor is driven to take a moving picture in the second modification of the apparatus.

In FIG. 15, time is plotted on the horizontal axis, F1 shows how the stepping motor 121 is driven to control the diaphragm mechanism 120, F2 shows how the motor 121 in the still-picture mode, and F3 shows the motor 121 in the moving-picture mode.

In the dive state F1, the stepping motor 121 is first stopped, then driven, further kept energized, and finally stopped.

In the drive state F2, the voltage applied to the stepping motor 121 is controlled in the still-picture mode. More precisely, voltage Va is applied to the stepping motor 121 to drive and energize the stepping motor 121, and voltage Vb (Va>Vb) is applied to the stepping motor 121 to stop the stepping motor 121.

In the drive state F3, the voltage Va is applied to the stepping motor 121 to drive, energize and stop the stepping motor 121 in the moving-picture mode. In the still-picture mode, the voltage applied to stop the motor 121 is lowered in order to save the electric power. In the moving-picture mode, the voltage applied to the motor 12 is fixed at Va. This is because the noise made as the voltage changes from Vb for stopping the motor 121 to Va for the motor 121 would otherwise be recorded in the moving-picture data. Thus, in the still-picture mode, the drive process is performed to save power; in the moving-picture mode, the derive process is performed to enhance the picture quality.

[Third Modification]

The third modification of the embodiment described above will be described.

FIG. 16 is a table showing the focus-diaphragm data used in the third modification of the apparatus, in which the interchangeable lens 100 incorporates a zoom optical system. The focus-diaphragm data represents the relation between the aperture opening of the diaphragm mechanism 120 and the position pulses of the stepping motor 112 for the third lens group, pulses corresponding to the optical distances to the zoom positions Z1, Z2, . . . Zn. The focus-diaphragm data may be stored in the focus-diaphragm data storage unit 135.

Since the focus-diaphragm data represents this relation, the stepping motor 112 for the third lens group can be controlled in position, in accordance with the aperture opening of the diaphragm mechanism 120 and the position pulses of the stepping motor 112, which is associated with the zoom positions Z1, Z2, . . . Zn.

The third modification described above can achieve a high-precision diaphragm control in accordance with the zoom position, even if the interchangeable lens 100 incorporates a zoom optical system.

[Fourth Modification]

The fourth modification of the embodiment described above will be described.

In Step S311 shown in the focusing process flowchart of FIG. 10, the lens CPU 130 terminates the focus drive process.

In the fourth modification, a focus-control terminating process may be performed as shown in the focus-control terminating process flowchart of FIG. 17. As shown in FIG. 17, the diaphragm control unit 134 determines, in Step S701, whether the present position of the stopping the motor 121 for the diaphragm mechanism 120 is identical to the target position acquired from the focus-diaphragm data about the stepping motor 112 for the third lens group.

If the present position of the stepping motor 121 is not identical to the target position acquired from the focus-diaphragm data, the diaphragm control unit 134 drives, in Step S702, the stepping motor 121, eliminating the difference between the present position of the stepping motor 121 and the target position calculated for the motor 121 from the focus-diaphragm data. If the stepping motor 121 is very far from the target position, the diaphragm control unit 134 finds the distance and direction for and in which the stepping motor 121 deviates from the target position. In accordance with the distance and direction, the diaphragm control unit 134 drives the stepping motor 121 to the target position.

The modifications described above are advantageous, particularly in the case where the focus control continues after the timing signal has driven the stepping motor 121. If the focus control ends immediately before the next timing signal is generated, the aperture opening of the diaphragm is not appropriate for the position where the focus lens group has finally stopped. In such a case, the position error of the stepping motor 121 for the diaphragm mechanism 120 can be corrected while the focus lens group remains stopped. The aperture opening of the diaphragm mechanism 120 can therefore be controlled at higher precision than otherwise.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical device comprising:
   an optical system including a focus lens group;
   a diaphragm unit configured to limit a light beam passing through the optical system;
   a focus-lens driving unit configured to move the focus lens group along an optical axis of the optical system;
   a diaphragm driving unit configured to control an aperture opening of the diaphragm unit;
   a diaphragm control unit configured to control the diaphragm driving unit in accordance with the position to which the focus lens group has been moved by the focus-lens driving unit, thereby controlling the aperture opening of the diaphragm unit; and
   a storage unit configured to store focus-diaphragm data representing the relation between the position of the focus lens group and the aperture opening of the diaphragm unit,
   wherein the diaphragm control unit controls the aperture of the diaphragm unit in accordance with the position of the focus lens group and on the basis of the focus-diaphragm data stored in the storage unit;
   wherein the storage unit stores data contained in the focus-diaphragm data and representing the aperture opening of the diaphragm unit, in the form of a minimum value by which to change the aperture opening, and stores data representing the position of the focus lens group, in association with the aperture opening of the diaphragm unit; and
   the diaphragm control unit controls the aperture opening of the diaphragm unit in accordance with data contained in the focus-diaphragm data stored in the storage unit and representing the position of the focus lens group.

2. The optical device according to claim 1,
   wherein the diaphragm driving unit includes a stepping motor, and
   the storage unit stores the number of drive pulses for the stepping motor, which corresponds to the minimum value by which to change the aperture opening.

3. The optical device according to claim 2,
wherein the storage unit stores the number of drive pulses, each being the minimum value by which to change the aperture opening.

4. The optical device according to claim 1,
wherein the optical system includes a zoom optical system, and the focus-diaphragm data is stored in the storage unit, in association with respective zoom positions defined by the zoom optical system.

5. The optical device according to claim 1,
wherein the diaphragm control unit controls the speed at which the diaphragm driving unit changes the aperture opening of the diaphragm unit, to a speed at which the focus lens group moves.

6. The optical device according to claim 1,
wherein the diaphragm control unit controls the aperture opening of the diaphragm unit in accordance with the position of the focus lens group and on the basis of the focus-diaphragm data, in response to a timing signal generated from data stored in the storage unit and representing the position of the focus lens group.

7. The optical device according to claim 6,
wherein the diaphragm control unit controls the aperture opening of the diaphragm unit, changing the same to a target aperture opening, in response to the timing signal.

8. A camera system, comprising:
an interchangeable lens having an optical system including a focus lens group; and
a camera unit to which the interchangeable lens is detachably secured,
wherein the interchangeable lens includes
  a diaphragm unit configured to limit a light beam passing through the camera system;
  a focus-lens driving unit configured to move the focus lens group along an optical axis of the camera system;
  a diaphragm driving unit configured to control an aperture opening of the diaphragm unit, and
  a diaphragm control unit configured to control the diaphragm driving unit in accordance with the position to which the focus lens group has been moved by the focus-lens driving unit, thereby controlling the aperture opening of the diaphragm unit,
wherein the camera unit includes a control unit configured to perform communication with the interchangeable lens,
wherein the focus-lens driving unit moves the focus lens group in accordance with an instruction coming from the control unit of the camera unit, and
wherein the interchangeable lens includes a storage unit configured to store focus-diaphragm data representing the relation between the position of the focus lens group and the aperture opening of the diaphragm unit; and the diaphragm control unit controls the aperture opening of the diaphragm unit in accordance with the position of the focus lens group and on the basis of the focus-diaphragm data stored in the storage unit;
wherein the storage unit stores data contained in the focus-diaphragm data and representing the aperture opening of the diaphragm unit, in the form of a minimum value by which to change the aperture opening, and stores data representing the position of the focus lens group, in association with the aperture opening of the diaphragm unit; and
the diaphragm control unit controls the aperture opening of the diaphragm unit in accordance with data contained in the focus-diaphragm data stored in the storage unit and representing the position of the focus lens group.

9. The camera system according to claim 8,
wherein the diaphragm driving unit includes a stepping motor, and
the storage unit stores the number of drive pulses for the stepping motor, which corresponds to the minimum value by which to change the aperture opening.

10. The camera system according to claim 9, wherein the storage unit stores the number of drive pulses, each being the minimum value by which to change the aperture opening.

11. The camera system according to claim 8,
wherein the optical system includes a zoom optical system, and the focus-diaphragm data is stored in the storage unit, in association with respective zoom positions defined by the zoom optical system.

12. The camera system according to claim 8,
wherein the diaphragm control unit controls the speed at which the diaphragm driving unit changes the aperture opening of the diaphragm unit, to a speed at which the focus lens group moves.

13. The camera system according to claim 8,
wherein the diaphragm control unit controls the aperture opening of the diaphragm unit in accordance with the position of the focus lens group and on the basis of the focus-diaphragm data, in response to a timing signal generated from data stored in the storage unit and representing the position of the focus lens group.

14. The camera system according to claim 13,
wherein the diaphragm control unit controls the aperture opening of the diaphragm unit, changing the same to a target aperture opening, in response to the timing signal.

* * * * *